United States Patent [19]

Cools

[11] 4,282,804
[45] Aug. 11, 1981

[54] TWINE WRAPPER FOR ROUND BALE FORMING MACHINE

[75] Inventor: Antoon S. P. Cools, Brugge, Belgium

[73] Assignee: Sperry Corporation, New Holland, Pa.

[21] Appl. No.: 97,761

[22] Filed: Nov. 27, 1979

[30] Foreign Application Priority Data

Nov. 28, 1978 [GB] United Kingdom ............... 46259/78

[51] Int. Cl.³ ............................................ B65B 13/18
[52] U.S. Cl. .......................................... 100/5; 100/88
[58] Field of Search ................. 100/5, 13, 88; 56/341

[56] References Cited

U.S. PATENT DOCUMENTS

| | | | |
|---|---|---|---|
| 2,627,223 | 2/1953 | Berge | 100/5 |
| 3,815,345 | 6/1974 | Mast | 56/341 |
| 3,910,178 | 10/1975 | Eggers | 100/5 |
| 3,913,473 | 10/1975 | Meiers | 100/5 |
| 4,150,614 | 4/1979 | Schwartz | 100/5 |

*Primary Examiner*—Billy J. Wilhite
*Attorney, Agent, or Firm*—Frank A. Seemar; James R. Bell; Larry W. Miller

[57] ABSTRACT

There is provided a crop material roll forming machine having a frame, means on the frame defining a roll forming region, a dispensing mechanism mounted on the frame and movable from a rest position across the roll forming region to dispense material for wrapping a bale in use formed in the machine, tensioning means associated with the dispensing mechanism and operable to tension the wrapping material as it is being applied to a crop roll, and means engageable with the tensioning means to render the latter inoperative at a predetermined point in the dispensing movement of the dispensing mechanism.

8 Claims, 14 Drawing Figures

TWINE WRAPPER FOR ROUND BALE FORMING MACHINE

BACKGROUND OF THE INVENTION

1. Field of the Invention

This invention relates to machines for forming round bales of crop material and has particular reference to the wrapping of bales formed in such machines with a flexible binding material such as conventional bale twine.

2. Description of the Prior Art

It was customary for a great number of years to harvest and store forage crops by mowing the crop in the field, permitting it to dry to a reasonable extent, forming it into windrows, and then compacting the windrows into rectangular bales by conventional hay baling machines. To store rectangular bales, they must either be conveyed to a shed or barn and stacked or, if they are left in a field, they must be covered with waterproof material to prevent rotting.

In recent years, an innovation has occurred in the baling art in the form of a machine which handles the cut crop material in a manner to coil the same into a relatively compact roll, usually of very substantial size and weighing many hundreds of pounds, for example between 1000 and 1500 pounds (455 and 680 kilograms). One of the principal advantages of roll type bales of forage crops is that they may be much more readily stored, as well as fed to herbivorous animals, simply by letting the rolls lie in the field of use or in a feed lot. In this way, animals may readily feed upon such rolls at will and the rolls are self water-shedding and so do not rot.

Several methods of forming of compact rolls of crop material have been devised and one of these involves rolling the swath or windrow of material along the ground until a roll of desired size is obtained. Another, and more successful, method is disclosed in U.S. Pat. No. 3,815,345 in which a swath or windrow of material is picked up from the field and directed onto a supporting conveyor. This conveyor transports the material in one direction whilst an upper apron, usually positioned above the supporting conveyor, moves in the opposite direction, thereby imparting to the crop material, which it contacts, a circular motion. In an off-the-ground roll forming machine of this type it has been found that to provide optimum weathering characteristics the bale must be rolled and maintained as tightly as possible, consistent with the animals being able to feed off it. The crop material is compacted during the bale forming operation by various types of compression devices which apply pressure to the periphery of the bale as it is being formed. To maintain this compactness, the bale must be secured as tightly as possible when it has been formed to the required size. To this end, the formed bale is wrapped within the machine with a suitable wrapping material such as twine or wire, for example.

For the purpose of illustrating a typical type of apparatus for disposing a roving type strand of wrapping material in a spiral manner around a round bale, attention is directed to U.S. Pat. No. 3,910,178. In the machine disclosed in this specification, the application of the binding material to the formed roll is at least in part effected manually by an operator sitting, for example, upon the seat of the tractor which propels the machine along a field.

Reference is also made to U.S. Pat. No. 3,913,473 in which the roving of the wrapping material is effected by a hydraulically-actuated mechanism which moves a twine directing arm substantially in a horizontal plane whilst distributing the wrapping material from the outer end of the arm which moves in an arcuate path between opposite sides of the bale forming machine.

A problem with known roll forming machines often arises at the commencement of a wrapping cycle during which a formed roll is bound with wrapping material. When the twine dispensing mechanism is in its rest position, a predetermined length of twine or other wrapping material dangles from the outlet end thereof. To start the wrapping of a formed roll, the operator swings the dispensing mechanism into the vicinity of the roll forming region, whereby the length of twine mentioned above contacts the bottom apron or conveyor of the roll forming chamber and the layer of crop material being fed to this chamber. It is the intention that the free end of twine be caught up by the crop material about to be added to the roll so as effectively to attach the free end of the twine to the roll so that actual wrapping can start.

Usually there is also provided some kind of tensioning device whereby a predetermined tension is applied to the twine or other wrapping material as it is wrapped around the crop roll so that the twine is tightly wrapped therearound to provide a crop roll of good stability. This tensioning may cause hesitation in the take up of the free end of the twine by the roll and thus the start of the wrapping cycle may be delayed. Occasionally, the wrapping cycle never commences. k It is the object of the present invention to avoid or to attenuate this problem.

According to the present invention there is provided a crop material roll forming machine having a frame, means on the frame defining a roll forming region, a dispensing mechanism mounted on the frame and movable from a rest position across the roll forming region to dispense material for wrapping a bale in use formed in the machine, tensioning means associated with the dispensing mechanism and operable to tension the wrapping material as it is being applied to a crop roll, and means engageable with the tensioning means to render the latter inoperative at a predetermined point in the dispensing movement of the dispensing mechanism.

Preferably, the dispensing mechanism comprises an elongate wrapping material directing arm of U-shaped cross-section and adapted to receive wrapping material between the limbs thereof. The directing arm may have an inlet for the wrapping material facing away from the roll forming region and an outlet for the wrapping material facing towards the roll forming region and movable back and forth across the machine in the vicinity thereof. The tensioning means may be pivotably mounted on the directing arm intermediate its ends and may comprise a tensioning member extending between the limbs of the U-shaped arm close to the bottom thereof. The tensioning member may comprise a leg which, in the operative position, is positioned parallel to and closely adjacent the bottom of the U-shaped directing arm so that wrapping material is engaged therebetween. Preferably, the tensioning leg is pivotable away from the bottom of the U-shaped directing arm in a direction generally corresponding to the intended direction of the passage of the wrapping material through the directing arm. This movement may be opposed by spring means extending between the tensioning means and the directing arm. The means engageable with the tensioning means may comprise a cam operable, when engaged by the tensioning means, to pivot the tensioning leg in said direction opposite to that caused by the action of the spring means. The cam may be secured to a fixed rod extending between opposed sides of the machine and is so positioned relative to the path of the dispensing means that the tensioning means are rendered inoperative, at the moment the dispensing mechanism has its outlet end closest to the roll forming region.

BRIEF DESCRIPTION OF THE DRAWINGS

A crop material roll forming machine according to the invention will now be described in greater detail, by way of example, with reference to the accompanying drawings, in which.

DETAILED DESCRIPTION OF THE DRAWINGS

Figure 1:
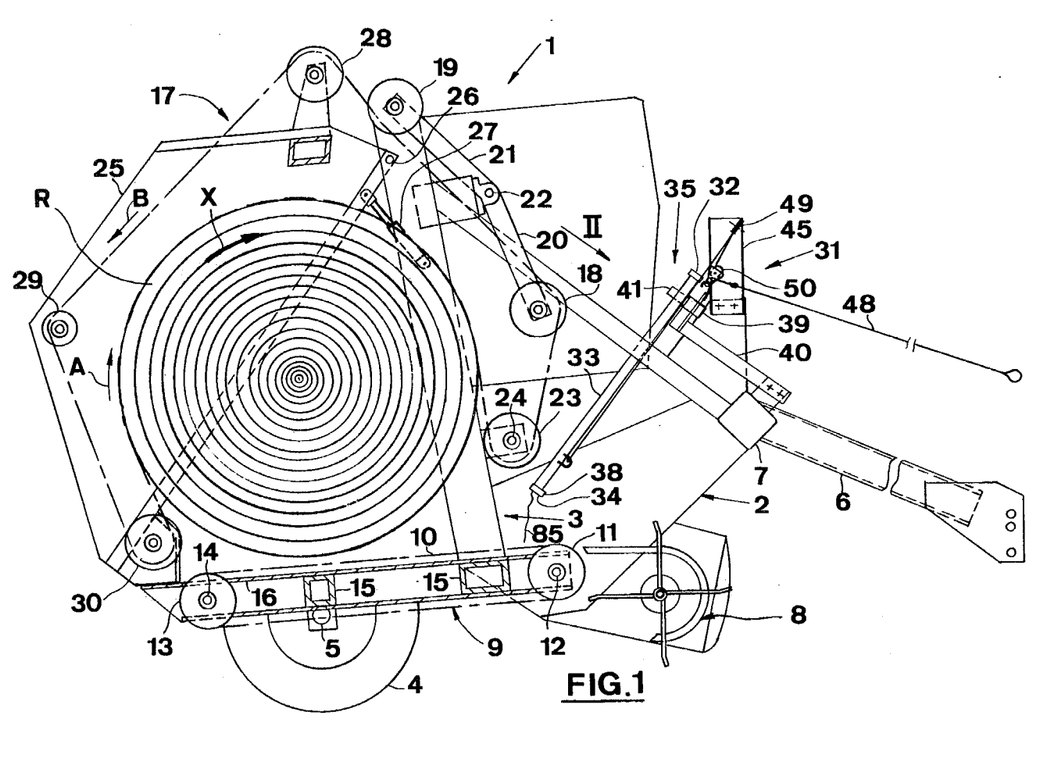
FIG. 1 is a right-hand side elevational view of the crop material roll forming machine.

In the following description, right-hand and left-hand references are determined by standing at the rear of the machine and facing in the direction of forward travel which is to the right as seen in FIG. 1. Also in the following description it is to be understood that such terms as "forward", "rearward", "right", "left", "upwardly" and "downwardly" are words of convenience and are not to be construed as limiting terms.

Referring to FIG. 1, the crop material roll forming machine 1 is provided with a base frame 2 having right-hand and left-hand sides (the right-hand side being omitted for clarity) between which extends a roll forming region 3 and within which a completed roll R is illustrated. The frame 2 is supported and made mobile by right-hand and left-hand ground-engaging wheels 4 (only the left-hand wheel 4 being shown) rotatably mounted on spindles 5 connected to and extending outwardly from respective opposite sides of the frame 2. The machine 1 is adapted to be connected to a tractor (not shown) by means of a tongue 6 the rear end of which is connected to a horizontal beam 7 of the frame 2. The beam 7 extends transversely between, and interconnects, the opposite sides of the frame 2.

Extending forwardly from the lower front portion of the mobile frame 2 of the machine 1 is a crop pick-up 8 adapted to engage, elevate and rearwardly feed a swath or windrow of crop material into the roll forming region 3 of the machine 1. The crop material engaged by the pick-up 8 is passed rearwardly to the front end of a lower apron 9.

The lower apron 9 is formed by a series of endless flexible lug-bearing chains 10 which are uniformly spaced in a transverse direction and which extend around front drive sprockets 11 mounted on a front shaft 12 rotatably supported between the sides of the frame 2 at the front thereof. The chains 10 also pass around rear idler sprockets 13 mounted on a shaft 14 rotatably supported between the sides of the frame 2 at the rear thereof.

Mounted upon longitudinally spaced transverse members 15 of the base frame 2 is a floor 16 which is rigid and generally horizontal. The upper courses of the lower apron chains 10 move in a rearward direction above the floor 16 to convey the crop material received from the pick-up 8 towards the rear of the machine 1.

The lower course of an upper apron assembly 17 engages and directs the crop material reaching the rear end of the frame 2 into an upward and forward direction to effect, in combination with the lower apron 9, rolling of the crop material into the roll R in the direction of the arrow X of FIG. 1. During roll forming, as the lower and upper courses of the upper apron assembly 17 move respectively in the directions of the arrows A and B in FIG. 1, the lower course of the upper apron assembly 17 is capable of moving outwardly as the roll R increases in diameter. This outward movement is accommodated by idler sprockets 18 and 19 which support portions of the upper course of the apron assembly 17 and which are mounted on arms 20,21. The arms 20,21 are disposed adjacent each associated side of the frame 2 and are supported on a common transverse shaft 22 rotatably mounted between the sides of frame 2. The arms 20,21 are biased by extension springs (not shown) which are mounted along the frame sides and which normally position the upper apron 17 in a contracted condition but are yieldable to allow the aforementioned outward movement of the lower course of the apron assembly 17 during roll formation.

The upper apron assembly 17 also extends around front drive sprockets 23 mounted on a shaft 24 rotatably supported between the sides of the frame 2.

The base frame 2 also supports a rear upper frame or tailgate assembly 25 which is pivotally connected at 26 to the upper portions of the sides of the frame. The tailgate assembly 25 is pivotable clockwise from its lower roll forming position, shown in FIG. 1, to an upper discharge position (not shown) by a pair of hydraulic cylinders 27 (only the left-hand cylinder 27 being shown) respectively mounted on, and extending along, the sides of the frame 2. The tailgate 25 rotatably supports upper, rear, and lower idler sprockets 28, 29 and 30, respectively, around which the upper apron assembly 17 also extends.

To supply rotary drive power to the pick-up 8 and the lower and upper aprons 9, 17, an input driveline (not shown) extends beside the tongue 6. The input driveline is adapted for connection at its forward end to the power take-off (PTO) shaft of the tractor which in use pulls the machine 1.

The hydraulic cylinders of the machine are connectible to an hydraulic power supply on the tractor.

In order that the roll R of desired diameter may be stabilised when discharged from the machine, the latter is provided with a supply of twine or the like which is arranged in a compact ball stored in a twine container (not shown) mounted to one side of the machine and forms part of a twine dispensing and wrapping mechanism 31. A strand of twine extends from the container to the inlet end 32 of a pivotally mounted twine directing arm 33 of the twine wrapping and dispensing mechanism 31. Twine dangles from the outer end 34 of the twine directing arm 33 and during the formation of the roll R of crop material, the outer end of the twine is held loosely at a position spaced away from the roll R. Under these circumstances the outer end of the twine is positioned to one end of the roll being formed and no substantial feeding of the twine will occur until it is desired to coil the twine around the completed roll R which occurs immediately before discharging the roll from the machine. When the coiling of the twine around the completed roll is to be effected, the twine wrapping mechanism 31 is operated whilst the roll R is continuously rotated about its central horizontal axis by the power derived from the drive shaft that is connected to the P.T.O. of the tractor and by means of suitable gearing, not shown, the drive shafts 12 and 24 are rotated to effect operation of the lower and upper aprons 9 and 17 for purposes of actuating the same in a manner described in detail in the U.S. Pat. No. 3,910,178. Such continuous rotation of the roll R effects frictional contact with the outer end of the twine in a manner to pull the twine through the twine directing arm 33, pivotal movement of the arm for roving operation thereof then being effected by the operator who is seated at that time upon the tractor, not shown.

Figure 2:
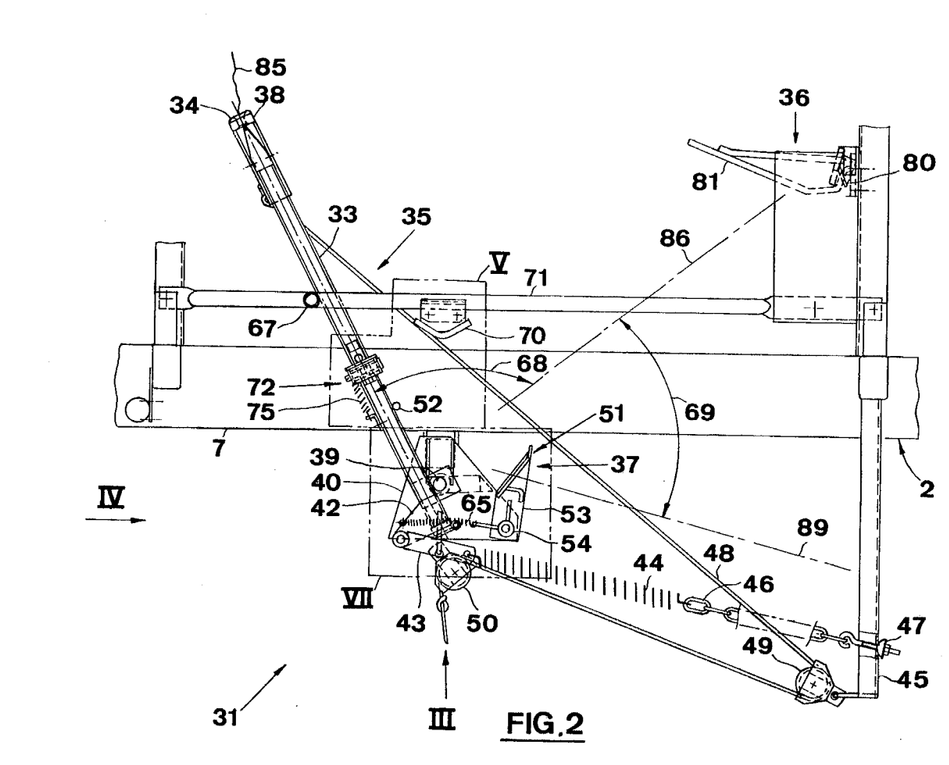
FIG. 2 is a fragmentary view taken in the direction of arrow II of FIG. 1 and turned through 180°.

The twine wrapping mechanism 31 comprises a twine dispensing assembly 35, part of which is the twine directing arm 33 already mentioned, and components for actuating the assembly 35. The twine wrapping mechanism 31 also comprises twine severing means 36 (FIG. 2) and latch means 37 (FIG. 2).

Figures 4, 6:
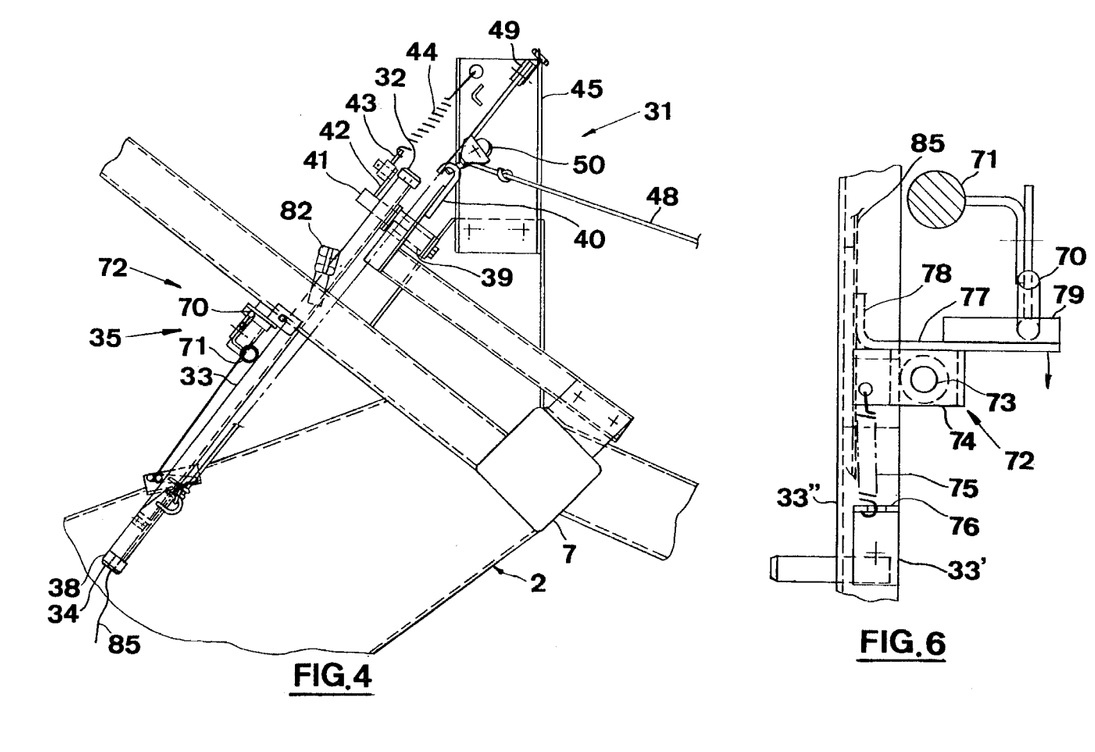
FIG. 4 is a side view taken in the direction of arrow IV of FIG. 2.
FIG. 6 is a view taken in the direction of arrow VI of FIG. 5.
Figure 5:
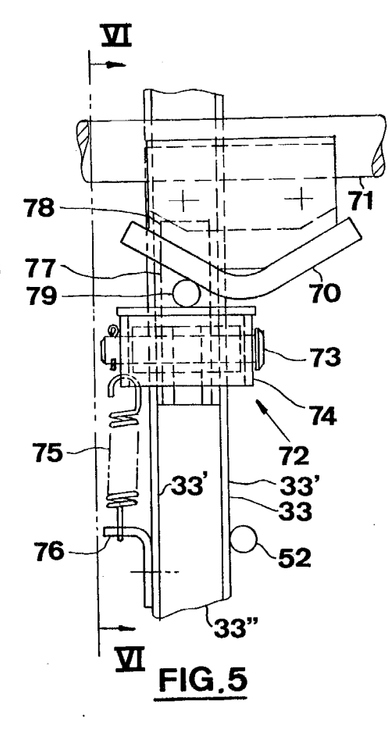
FIG. 5 is a fragmentary view on a larger scale of the components indicated at V in FIG. 2 but with those components in another characterising position.

The twine directing arm 33 is generally U-shaped in cross section having two limbs 33' bridged by a base portion 33" (FIGS. 5, 6 and 7) and arranged to receive twine between the limbs 33'. The arm 33 further also comprises a twine guide member 38 at its outer or twine discharge end 34 and is pivotally mounted adjacent its other or inlet end 32 via a pivot 39 on a support 40. The support 40 is attached to the transverse beam 7 of the base frame 2 intermediate its transverse ends. The pivot 39 is offset relative to the twine directing arm 33 and comprises an end 41 projecting above the level of the arm. Furthermore, the pivot 39 is inclined in a rearward and upward direction in a manner so that the arm is movable in a plane which is inclined to the vertical at about an angle of 45°. The twine discharge end 34 of the arm 33 is movable along an arcuate path which is at least partially positioned closely adjacent the roll forming region 3. Such a position of the discharge end 34 of the arm 33 is shown in FIG. 1. In its rest position, the arm 33 is positioned generally towards the left-hand side of the machine and as shown in dotted lines at 89 in FIG. 2. The twine directing arm 33 is latched in this position by the latch means which are generally indicated at 37 and which will be described hereinafter.

Figure 3:
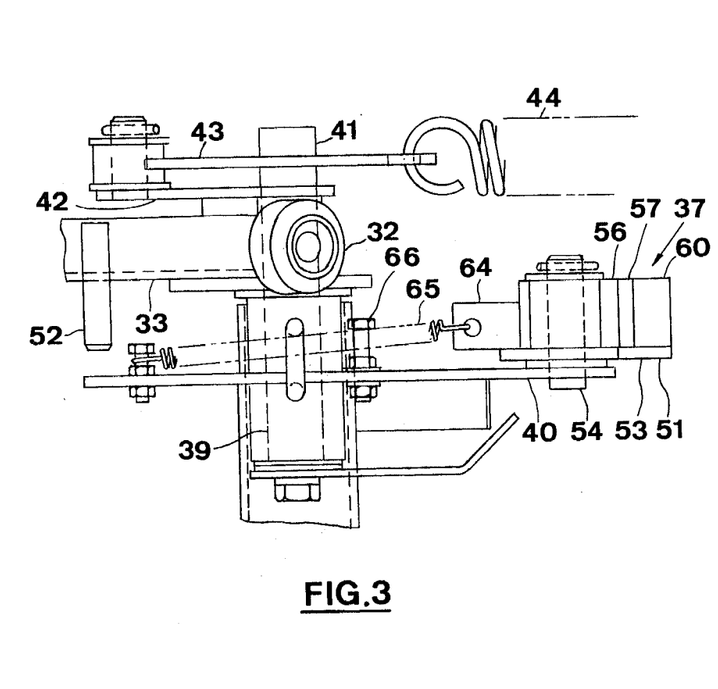
FIG. 3 is another fragmentary view taken in the direction of arrow III of FIG. 2.

A bracket 42 is secured to the twine directing arm 33 at the inlet end 32 thereof and at the side of that arm opposite to the side at which the pivot 39 is provided. A link 43 is pivotally coupled at one end to the bracket 42 and is arranged in a manner so that it may engage the pivot end 41 of the arm 33 as can best be seen in FIG. 3. The link 43 is coupled at its other end to a strong coil spring 44, which itself is adjustably coupled to a fixed member 45 of the base frame 2 via a chain 46 and a bolt and nut arrangement 47.

Control means for the dispensing mechanism are provided in the form of a rope 48 or other flexible means attached to the twine directing arm 33 adjacent its outlet end 34 and extending therefrom in a forward direction and to the left of the machine where it is wrapped around a reversing roller 49 pivotally attached to the fixed member 45. The rope 48 extends generally in the plane in which the arm 33 is movable. The reversing roller 49 is positioned forwardly of the pivot 39 when seen in a transverse direction. From the reversing roller 49 the rope 48 extends back towards the centre of the machine where it is wrapped around a further reversing roller 50 pivotally mounted on the support 40. The rope 48 extends in a generally forward direction from the reversing roller 50 to the vicinity of the operator's seat (not shown) on the pulling tractor. At this location the rope 48 may be attached to a further support (not shown). Pulling the rope 48 in a forward direction will swing the twine directing arm 33 in a direction opposite to the action of the coil spring 44.

The latch means 37 mentioned above comprise a pivotally mounted latch member 51 which is cooperable with a latch pin 52 welded or otherwise secured, to the twine directing arm 33. The latch member 51 is of special shape and basically is composed, as best seen in FIGS. 7 to 14, of a flat element 53 of elongate shape with a number of ribs thereon. The elongate element 53 is pivotally mounted adjacent one end on the support 40 via a pivot 54 and has an opposed end 55 which is generally at an angle relative to its longitudinal axis. A first rib 56 is welded to the element 53 so as to project generally perpendicularly therefrom and to extend generally in the longitudinal direction of the elongate element 53 from its pivot 54. A second rib 57 of a generally L-shape extends with its longer leg 58 generally transverse to the longitudinal axis of the element 53 and thus with its shorter leg 59 generally parallel to the first rib 56. The extreme end of the shorter leg 59 is spaced transversely of the extreme end of the first rib 56 and is positioned generally at the same longitudinal distance away from the pivot 54. Coupled to the extreme end of the longer leg 58 of the rib 57 is a third rib 60 comprising a longer portion 61 and a shorter portion 62 positioned at an angle relative to the longer portion 61. The longer portion 61 is generally parallel to the angled end 55 of the elongate element 53 whilst the shorter portion 62 is generally aligned with the shorter leg 59 of the second rib 57 and positioned at the extreme end of the element 53 opposite to its pivot 54. The extreme end 63 of the longer portion 61 is positioned substantially at the same longitudinal spacing from the pivot 54 as the extreme end of the shorter leg 59 of the second rib 57; both of these extreme ends are positioned at opposite sides of the first rib 56.

A coupling arm 64 is welded to the element 53 and extends from the pivot 54 in a direction generally perpendicular to the longitudinal axis of that element. A spring 65 is attached at one end to the coupling arm 64 and is connected at its opposite end to the support 40. A stop 66 on the support 40 is engageable by the spring 65 when the latch member 51 is in a certain position for a reason to be described.

A cam 70 is fixedly secured to a transverse fixed member 71 of the base frame 1 and serves a purpose to be described. The fixed member 71 is in the form of a transverse rod mounted on, and extending between, the opposite side walls of the base frame 1. Preferably the cam 70 is provided substantially in the same vertical fore-and-aft plane as the pivot 39 of the twine directing arm 33.

A twine tensioner 72 (best seen in FIGS. 5 and 6) is pivotally mounted on the twine directing arm 33 intermediate its ends by a pivot 73 firmly secured on the limbs 33' of the U-shaped arm 33 and pivotally supports an inverted U-shaped member 74 the legs of which are positioned alongside the arm 33. A coil spring 75 is attached to one of these legs of the member 74 and is connected at its other end to a mounting bracket 76 on the one side of the arm 33. The coil spring 75 is positioned alongside and outside the U-shaped twine directing arm 33. Secured to the member 74 is a twine tensioning member 77 with a leg 78 which is bent in the direction of the twine run. The leg 78 is positioned within the limbs 33' of the U-shaped arm 33 and, in the operative position, is generally parallel to and closely adjacent the bottom 33'' of the arm so that the twine is engaged therebetween and is thus tensioned when the leg is in this position. The arrangement is such that the twine tensioning member 77 may pivot away from the bottom 33'' of the U-shaped arm 33 in the direction of the twine run therethrough and opposite to the force of the spring 75.

Attached to the twine tensioning member 77 is a cam engaging rod 79 which, as the twine directing arm 33 is moved past the cam 70, engages the latter in a manner so as to cause the twine tensioner 72 to pivot around the pivot 73 opposite to the spring force of coil spring 75.

A stationary knife 80 is secured to the left-hand side wall of the machine at a location slightly below the plane in which the twine directing arm 33 is movable and adjacent the left-hand end of the roll forming region 3. The stationary knife 80 has a cutting edge facing away from the roll forming region 3. A guide 81 is secured to the frame 1 and extends over the knife 80 to guide the wrapping material (twine) onto the knife 80 to sever the wrapping material at the end of the wrapping operation.

OPERATION

In preparation for the roll wrapping operation, once the roll R has reached its desired size, the operator normally stops further forward movement of the machine 1 so as to interrupt the flow of crop material delivered by the pick-up mechanism 8. The bale R continues to be rotated within the machine and the operator actuates the twine dispensing assembly 35. In its initial rest position 89 (FIGS. 1 and 2) the twine directing arm 33 is disposed more or less parallel to the transverse frame member 7, forwardly of the bale forming region 3, and with the free or twine outlet end 34 of the arm 33 disposed adjacent the left-hand side of the machine. The arm 33 is somewhat longer than half the width of the bale forming region and thus the pivot 39 is positioned to the right of the fore-and-aft centre line of the machine. The twine directing arm 33 is latched in this rest position by the latch means 37. Indeed the latch pin 52 on the arm 33 is positioned between the legs of the L-shaped rib 57 of the latch member 51 and is held therein by the spring 44 (as is best seen in FIG. 7).

The twine 85 extends from the compact twine ball, which is stored in the twine container (not shown) mounted to one side of the machine, via a stationary twine guide 82 to the twine directing arm 33. The twine 85 extends through the inlet end 32 of the arm 33 to pass between the limbs 33' of the U-shaped arm 33 and underneath the leg 78 of the twine tensioner 72. The twine 85 further extends through the outlet end 34 of the arm and a certain length of twine 85 dangles therefrom (FIG. 1). This dangling end of the twine 85 is held away from the bale forming region 3 as long as the twine directing arm is positioned in its rest position. Under this condition no substantial feeding of the twine will occur partially because the twine tensioning means 72 firmly holds the twine.

To unlatch the twine dispensing assembly, the operator pulls on the rope 48 in a forward direction, i.e. against the action of the spring 44 acting on the twine directing arm 33. Thereby the latch pin 52 is moved out of the hollow side of the L-shaped rib 57 on the latch member 51. Simultaneously, the spring 65 pivots the latching member 51 over a relatively small angle in the anticlockwise direction as seen in FIGS. 7 to 14. Thus, the shorter leg 59 of the L-shaped rib 57 is moved to the opposite side of the latching pin 52 and thus, when the operator releases the pull on the rope 48, the pin 52 will pass beyond the shorter leg 59 of the L-shaped rib 57. This step in the operation is shown in FIG. 8, where it is indicated that the latch member 51 is moved in the direction 83 whilst the arm 33 is moving in the direction 84 toward the bale forming region 3.

Figure 7:
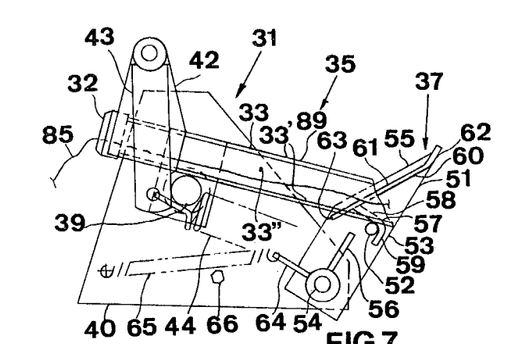
FIG. 7 is a fragmentary view, on a larger scale, taken at VII in FIG. 2 but with certain components omitted for the sake of clarity and with the components which are shown in another characterising position.
Figure 8:
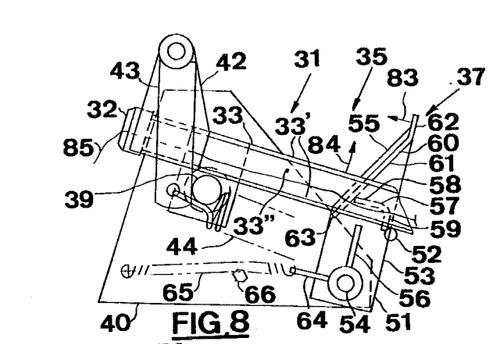
FIGS. 8 to 14 are views similar to the view shown in FIG. 7 but with the components in different characterising positions.
Figure 9:
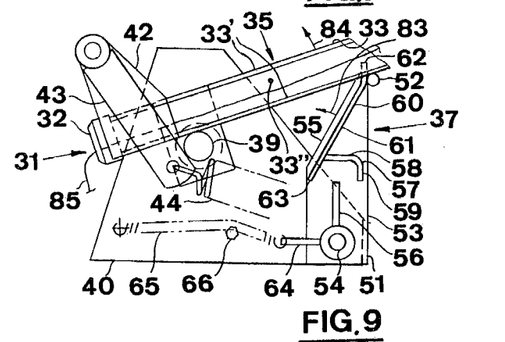

As seen in FIGS. 7 to 9, the link 43 abuts the pivot end 41 of the arm 33 when the latter is in its rest position as well as when the arm 33 moves through the first part of its path of movement. Thereby, the pivot torque exerted by the spring 44 on the twine directing arm 33 is relatively small which is sufficient as during the initial part of the movement of the arm 33 no substantial resistance is encountered.

Releasing the rope 48 results in the arm 33 pivoting through the non-operative sector 69 (FIG. 2) of its path towards the right-hand side of the bale forming region 3. Occasionally the dangling end of twine 85 may be caught by the revolving bale R, whereby wrapping of twine therearound may start. However, most frequently this wrapping will start much later.

Whilst the arm 33 is moving through the sector 69 of its path, the latch pin 52 engages the right-hand side (as seen in FIG. 9) of the third rib 60 on the latch member 51, whereby the latter is pivoted still further in the direction 83 around the pivot 54. Thereby the spring 65 engages the stop 66 as is shown in FIG. 9. This helps to damp the oscillatory motion of the latch member 51 when it is released and swings back to its rest position shown in FIG. 10. Also, the stop 66, which is made adjustable on the support 40, is useful for properly adjusting the rest position.

Further release of the rope 48 permits the spring 44 to pivot the arm 33 to a generally fore-and-aft directed position. In this position, the twine outlet end 34 of the arm 33 is positioned at its closest point to the bale forming region 3, which at the same time is also the lowermost point in the path of movement of the arm. This is the most ideal position for starting the wrapping of the bale R with twine.

As the arm 33 moves past this ideal position, the free end of the twine 85 is deposited on the lower apron 9 or, if there is still crop material moving into the machine, that end is deposited thereon and is entwined therewith. Frictional contact between the twine and the apron and the crop material carries the twine rearwardly into the bale forming region 3 wherein it is wrapped around the roll R as the latter is rotated. To facilitate this, and to eliminate any hesitation in the commencement of the twine-wrapping operation, it is ideal to reduce the resistance on the twine to a minimum. This is accomplished by rendering the twine tensioner 72 inoperative at the point where the discharge end 34 of the arm 33 is closest to the bale forming region 3. As the arm passes the cam 70 on the rigid member 71, the cam 70 engages the rod 79 on the twine tensioning member 77 thus pivoting the leg 78 thereof away from the base of the U-shaped arm 33 and out of engagement with the twine. Thus, the end of the twine 85 is now easily pulled from the ball thereof by the rotation of the bale R without any hesitation and the first loop of twine is wrapped relatively loosely around the bale.

As the twine directing arm 33 is swung further to the right of the machine (this is as seen left in FIG. 2) as the roll bale R is rotated, twine will be pulled through the arm 33 and spirally wound around the bale. As soon as the arm 33 has moved past the cam 70, the coil spring 75 again renders the twine tensioner 72 operative by urging the leg 78 of the twine tensioning member 77 towards the base of the U-shaped arm 33 and into engagement with the twine. Thus the twine tension is increased, whereby the twine is wrapped tightly around the bale.

Figure 10:
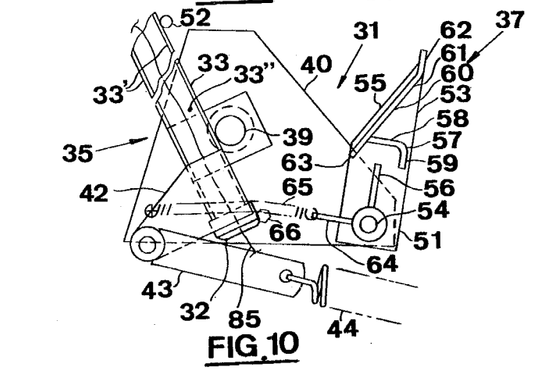
Figure 11:
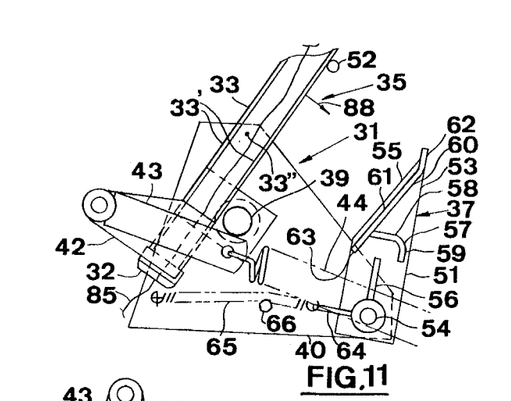

As the twine directing arm 33 transverses its path transversely of the machine, the twine being wrapped around the revolving bale lags to some extent relative to the discharge end 34 of the arm 33. When the arm 33 is moved from its generally fore-and-aft extending position to its extreme right position (as shown in FIG. 2), this lagging results in a substantial pull on the arm 33 which tends to stop further movement of the arm 33 to the right of the machine. To overcome this, the spring 44 exerts a torque on the arm 33 about the pivot 39 during this part of the arm movement which substantially exceeds the torque produced during the first part of the twine wrapping cycle. As shown in FIG. 10, when the arm 33 is moved in the right-hand side of the machine, the link 43 no longer contacts the pivot end 41 of the arm 33, but instead is spaced at a substantial distance from the pivot. Thus the torque of the spring 44 increases substantially even though the spring 44 is shorter when the arm 33 is in the position just described because the moment arm relative to the pivot 39 is increased.

The arm 33 abuts the stop 67 on the fixed member 71 when its reaches its extreme right-hand position. To complete the twine-wrapping operation the arm 33 has to be pivoted from its extreme right-hand position shown in full lines in FIG. 2 to a position to the left thereof shown schematically at 6 in the same Figure (this position being to the right as seen in FIG. 2). To this end, the operator pulls the rope 48 in the forward direction thus tensioning the spring 44. As the arm 33 passes the cam 70 during its movement from right to left of the machine, the twine tensioner 72 is temporarily rendered inoperative by the pivoting of the leg 78 as previously described so that a portion of twine will be wrapped loosely around the bale. This is not disadvantageous because as soon as the arm 33 moves past the cam 70, the twine will be tensioned again and the loose loop will be tightened.

Usually, it is desirable to wrap a plurality of spiral loops of twine around the bale R and, therefore, the twine directing arm 33 is swung several times back and forth across the width of the bale forming region 3. Full circles of twine are placed around the bale adjacent each end by temporarily stopping the movement of the arm 33 as it reaches the respective ends of its path of movement.

Preparation for severing the twine occurs as the arm 33 moves to the left of the machine past the position indicated at 86 in FIG. 2. At this point the twine moves across the twine guide 81 towards the stationary knife 80. Prior to the twine reaching the knife 80, the arm 33 is moved rapidly to its generally horizontal position across the sector 69 of its path so that a relatively long piece of twine is pulled out of the arm 33 prior to the twine being severed. This ensures that a sufficient length of twine extends from the discharge end 34 of the arm 33 ready for the wrapping of the next bale. Finally, as the arm 33 reaches its rest position 89, the twine 85 passes beyond the twine guide 81 and engages the knife 80 and is thereby automatically cut due to the rotational movement of the bale being wrapped. The severed twine is pulled around the bale as the latter continues to rotate whilst that twine remaining in the arm 33 is held ready for the next bale to be wrapped.

Figure 12:
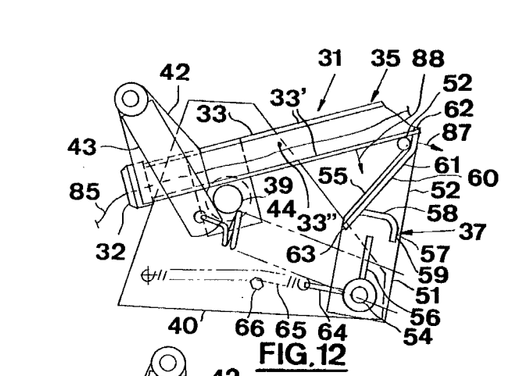
Figure 13:
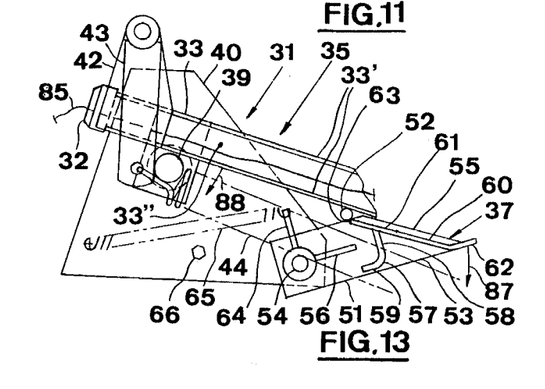
Figure 14:
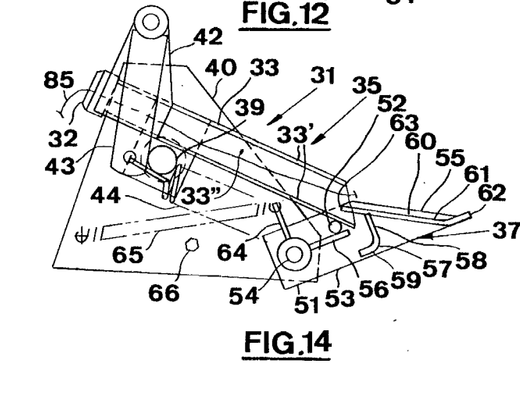

As the arm 33 approaches its rest position 89 it is automatically latched again. Successive steps during the last part of the cycle of the arm 33 are shown in FIGS. 11 to 14, whereafter the device reaches its rest position as shown in FIG. 7. As the arm 33 is swung towards its rest position 89, the latch member 51 is in its position shown in FIG. 11. During further movement of the arm 33, the latch pin 52 contacts the third rib 60 and causes the member 51 to pivot in the clockwise direction 87 as seen in FIG. 12. Continued movement of the arm 33 causes the pin 52 to slide along the leading face of the third rib 60 until it reaches the extreme end 63 thereof and moves to the other side of the rib (FIG. 13). At this moment, the member 51 is pivoted back in an anti-clockwise direction as seen in FIG. 14 under influence of the coil spring 65 until the latch pin 52 contacts the first rib 56. When the operator releases the rope 48 allowing the spring 44 to swing the arm 33 back over a small angle, the latch pin 52 seats in the hollow side of the second rib 57, thus positively latching the twine dispensing assembly in its rest position 89 as shown in FIG. 7. In this rest position 89, the coil spring 44 is fully tensioned ready to start the next cycle when another formed bale is to be wrapped. At this time, the bale just wrapped is ready for discharge from the machine and to this end the tail gate assembly 25 is opened by means of the hydraulic cylinders 27, whereby the bale drops onto the ground.

It will be seen from the foregoing that the latch means are very simple in use and requires no separate handles and manipulations to render operative and inoperative. Indeed, the latch means can be unlatched merely by pulling the twine directing arm control rope (48) forwardly over a short distance. Also the arm 33 is latched entirely automatically after completing a bale wrap as it approaches its rest position.

Furthermore, the twine directing arm control 33, including the rope 48 and the spring 44, are very simple in design yet highly reliable in operation. The arrangement is further such that the maximum torque is obtained from the coil spring 44 during the first half, or forward stroke of the arm 33 in the wrapping cycle when it is needed. During that part of the path of movement in which the arm 33 is moved from the left of the machine to its generally fore-and-aft extending position, the rotational movement of the bale R exerts a pull on the twine which assists in moving the arm 33 to its fore-and-aft extending position. Thus no extra torque is required from the coil spring 44. However, as some resistance is experienced when the arm 33 passes the cam 70, some extra torque is required from the coil spring 44. Also, whilst the arm 33 is moving from its generally fore-and-aft extending position towards its extreme right-hand position, the lagging of the twine as it is being wrapped around the bale creates a pull on the arm 33 in a direction opposite to the intended direction of rotation as already mentioned. Therefore, during this part of the forward half of each wrapping cycle, additional torque is required from the spring 44 which is obtained because the moment arm of the spring 44 relative to the pivot 39 is increased somewhat during this part of the arm movement.

Also, the twine tension is relieved at the moment when the twine is required to slip easily through the twine directing arm 33 so as to be readily available at the start of the actual wrapping of the bale. This is accomplished by the cam 70 rendering the twine tensioner 72 inoperative at the appropriate moment. Also, the twine tensioner 72 is so designed that should a knot or another thickening appear in the twine, the twine tensioner will automatically open under the pulling force on the twine as the knot or other thickening passes the twine tensioner. Thus jamming of the twine in the twine tensioner is positively avoided.

Furthermore, the components of the latch means 37, the twine wrapping mechanism 31 and the twine tensioner 72 are relatively small, very easily, and hence inexpensively, produced, and yet reliable in operation.

Other aspects of the illustrated embodiment are described and claimed in co-pending Patent Application Ser. No. 097,760, filed Nov. 27, 1979.

What I claim is:

1. A roll forming machine comprising
   (a) a mobile frame,
   (b) a roll forming region defined within the frame,
   (c) dispensing means mounted to the frame and movable across the roll forming region to dispense wrapping material about a completed roll being formed in the machine, said dispensing means comprising an elongate wrapping material directing arm with an inlet and an opposed outlet for the wrapping material, the improvement comprising
   (d) tensioning means mounted on the wrapping material directing arm intermediate its inlet and outlet ends and operable to tension the wrapping material as it is being applied to a roll, and
   (e) means engageable with the tensioning means to render the latter inoperative at a predetermined point in the dispensing movement of the wrapping material directing arm.

2. The machine according to claim 1, wherein the wrapping material directing arm comprises opposing sides and at least one member connecting the opposing sides and wherein said arm is adapted to receive the wrapping material and to pass it therethrough between said opposing sides and between the inlet and outlet ends thereof.

3. The machine according to claim 2, wherein the tensioning means comprise a clamping member pivotally mounted between the opposing sides of said wrapping material directing arm and movable between clamping and non-clamping positions with the connecting member.

4. The machine according to claim 3, wherein the clamping means, when in the operative position, is positioned generally parallel to and closely adjacent the connecting member so that wrapping material is engaged therebetween and is pivotable away from the connecting member in a direction generally corresponding to the intended direction of movement of the wrapping material through the dispensing mechanism.

5. The machine according to claim 4, further also comprising spring means extending between the clamping member and the wrapping material directing arm to urge the clamping member towards the connecting member of the wrapping material directing arm.

6. The machine according to claim 4 wherein, the means engageable with the tensioning means comprises a cam engageable with the clamping member such that the tensioning means are inoperative with the engagement of the clamping member by the cam to substantially reduce the tension on the wrapping material at the predetermined point.

7. The machine according to claim 6 wherein the cam is fixedly secured to the frame.

8. The machine according to claim 6, wherein the predetermined point is located such that the corresponding position of the outlet end of the wrapping material directing arm is closest to the roll forming region.

* * * * *